United States Patent [19]

Ball et al.

[11] Patent Number: 4,915,623

[45] Date of Patent: Apr. 10, 1990

[54] CALCINATION APPARATUS

[75] Inventors: David J. Ball; Edward Varney; Philip Curtis, all of Nottingham, Great Britain; Martin Dzidrums, Ontario, Canada

[73] Assignee: United States Gypsum Company, Chicago, Ill.

[21] Appl. No.: 317,179

[22] Filed: Feb. 28, 1989

Related U.S. Application Data

[63] Continuation of Ser. No. 115,468, Oct. 30, 1987, abandoned.

[30] Foreign Application Priority Data

Oct. 30, 1986 [GB] United Kingdom ............... 8625964

[51] Int. Cl.⁴ .............................. F26B 9/18; B01J 6/00
[52] U.S. Cl. .................................... 432/139; 432/197; 432/14; 422/114
[58] Field of Search ................... 432/9, 13, 14, 96, 98, 432/106, 139, 197, 199, 214, 215; 422/114

[56] References Cited

U.S. PATENT DOCUMENTS

| | | | |
|---|---|---|---|
| 1,234,240 | 7/1917 | Wiederwax | 432/197 |
| 2,464,304 | 3/1949 | Gottlieb | 432/14 |
| 4,529,374 | 7/1985 | Malik et al. | 432/14 |
| 4,576,573 | 3/1986 | Ruehenbeck | 432/197 |
| 4,615,867 | 10/1986 | Heckman | 432/139 |

Primary Examiner—Henry C. Yuen
Attorney, Agent, or Firm—John M. Lorenzen; Robert H. Robinson

[57] ABSTRACT

The invention concerns an improved method of calcining gypsum in which non-reactive hot gas is passed into contact with the gypsum from a source through a plurality of tubes extending downwardly into the gypsum. The invention also contemplates an improved apparatus which comprises a calcining kettle and a plurality of tubes connected to a common source of non-reactive hot gas and extending downwardly into the kettle and having openings in their lower regions to release the hot gas into the contents of the kettle. The invention provides a method and apparatus which produces gypsum plaster of improved quality and with less insoluble anhydrite.

11 Claims, 3 Drawing Sheets

CALCINATION APPARATUS

This is a continuation of co-pending application Ser. No. 115,468 filed on Oct. 30, 1987, now abandoned.

This invention relates to calcination apparatus, and more particularly to apparatus for calcining calcium sulphate dihydrate, or gypsum.

A commercially important method of calcining gypsum is by indirect heating of a bed of gypsum in a calcining kettle. The heat input may be enhanced by the direct introduction of hot gas through a dip tube extending downwardly into the bed of gypsum in the kettle. Such a method, which may be operated as a continuous process, is described in GB 1 488 665. The need for indirect heating can be avoided by the use of a conical kettle in which the only source of heating is hot gas passed into the gypsum through a tube to fluidise and calcine it. The interior of the kettle is shaped to ensure that all the gypsum in the kettle is calcined. Such a kettle, which is particularly suited to continuous operation, is described in GB 2 043 219.

Direct heating techniques, although increasing the throughput of calcining kettles, can lead to the formation of insoluble calcium sulphate anhydrite, which reduce the quality of the plaster produced. It is believed that the temperature of the hot gas entering the gypsum bed is an important factor in the production of anhydrite. The production of insoluble anhydrite occurs when using direct heating fired by gas or oil, but is more marked in the case of gas.

According to the present invention there is provided a method of calcining gypsum comprising contacting the gypsm with non-reactive hot gas from a hot gas source, in which the hot gas is passed into the gypsum from the source through a plurality of tubes extending downwardly into the gypsum.

There is further provided according to the present invention apparatus for calcining gypsum comprising a calcining kettle for containing material to be calcined and a plurality of tubes extending generally downwardly into the interior of the kettle, the upper regions of the tubes being in communication with a common source of non-reactive hot gas and the lower regions of the tubes having openings for introduction of the hot gas into the contents of the kettle.

The number and size of the tubes is preferably such as to increase the surface area of the tubes available for heat exchange between the hot gas in the tubes and the material to be calcined by at least twice, and preferably three or four times, compared with that available in a conventional kettle.

The invention will be further described by way of example with reference to the drawings in which.

Figure 1:
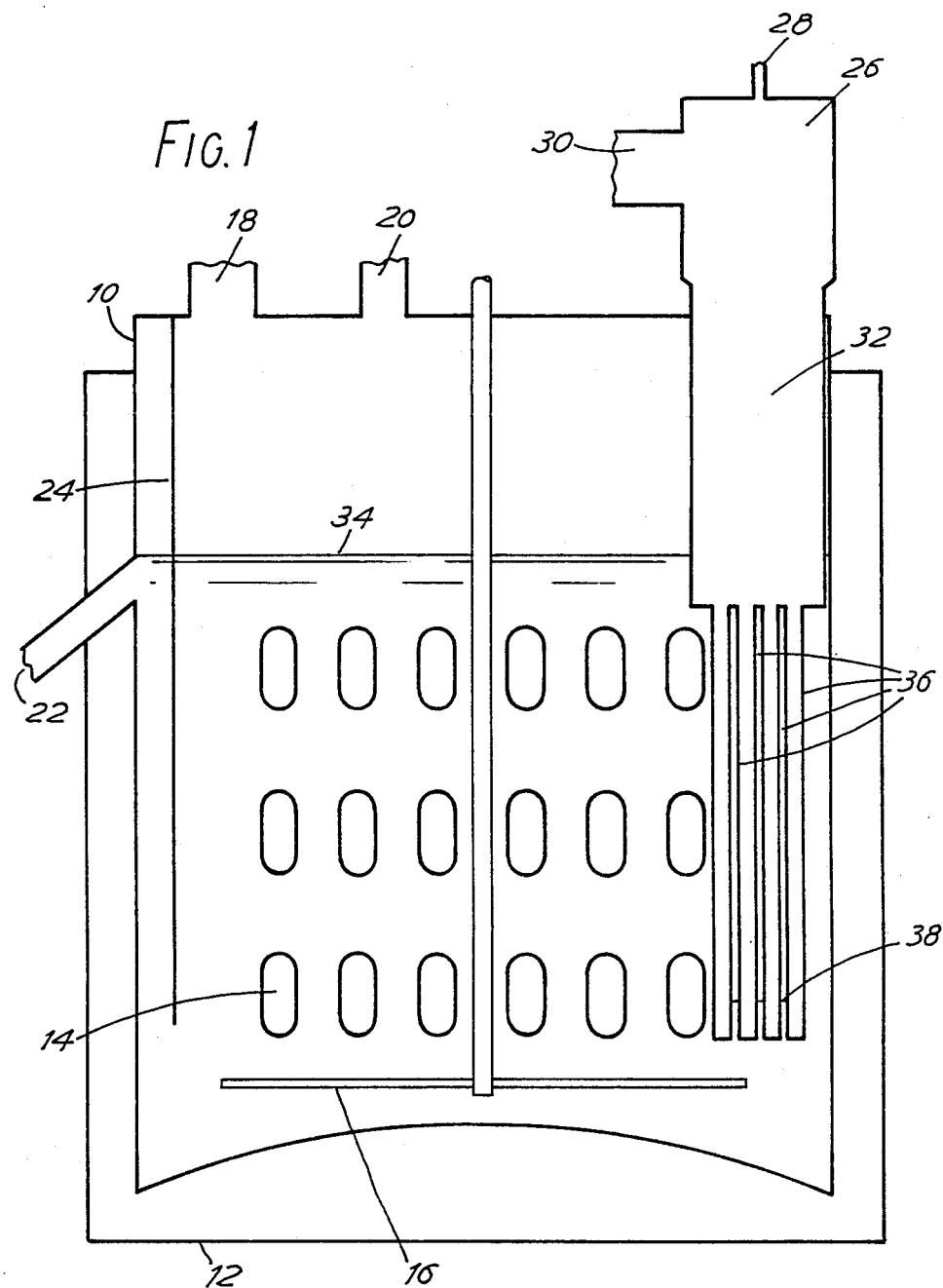
FIG. 1 is a diagrammatic vertical section through a calcining kettle according to a first preferred embodiment of the invention, containing gypsum.

The kettle shown in FIG. 1 comprises an externally heated steel vessel 10 surrounded by a jacket 12. The space between the vessel 10 and the jacket 12 is supplied, from a source not shown in the drawings, with hot fluid such as hot gaseous combustion products. This fluid is also carried by cross tubes 14 through the vessel, which is provided with a stirrer 16. The upper wall or lid of the vessel is provided with an inlet 18 for powdered gypsum, and a vent 20 for exhaust gases. An outlet 22 for calcined gypsum is provided in the upper part of the vessel side wall enabling the kettle to operate continuously. This outlet is protected by a channel 24.

Direct heat and fluidisation is provided by hot gas from a combustion chamber 26 mounted above the top wall or lid of the kettle. The combustion chamber 26 has a fuel inlet 28 and an air inlet 30. The fuel/air mixture is burnt in the combustion chamber 26, and passes into the kettle through a refractory lined tube 32 which extends just below the level 34 of gypsum in the kettle. The tube 32 opens into a plurality of dip tubes 36. The arrangement shown in FIG. 1 finds particular application when the fuel employed is oil. If the fuel employed is gas, the combustion chamber need not be lined with refractory material. The burner may be situated anywhere within this chamber. The dip tubes 36 are restrained against excessive movement by a frame 38 extending between the tubes. Preferably, this frame allows the tubes a little movement.

Figure 2:
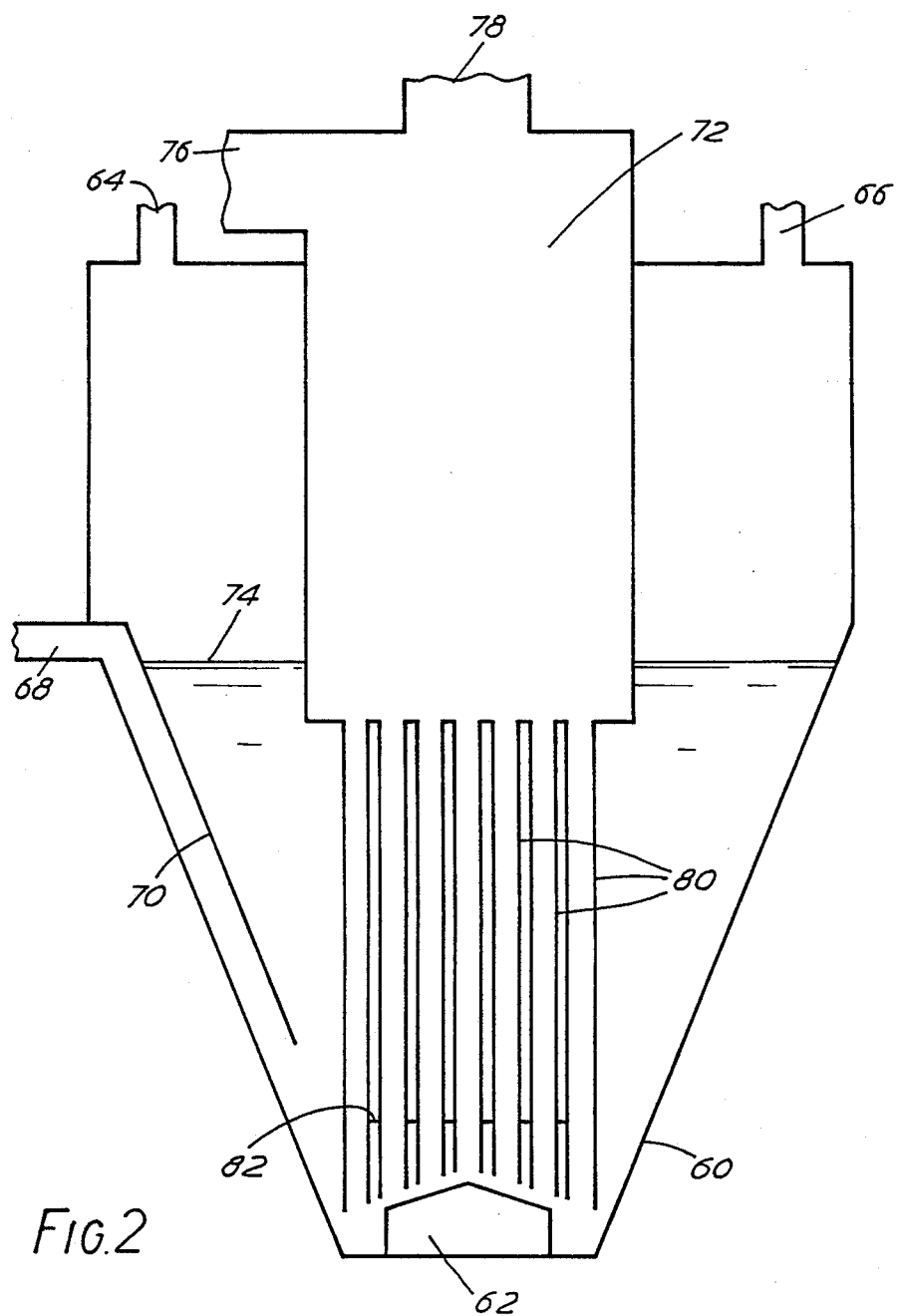
FIG. 2 is a diagrammatic vertical section through a calcining kettle according to a second preferred embodiment of the invention, containing gypsum.

The embodiment of FIG. 2 is a so-called conical kettle. It comprises a kettle 60, the lower portion of which has a generally conical shape and the bottom wall of which is provided with an upright cone 62 of heat resistant material which extends into the interior of the kettle. The kettle has a gypsum inlet 64 and an exhaust gas vent 66 in it upper wall, and an outlet 68 for calcined gypsum in its side wall, protected by a channel 70. In another, similar embodiment, the cone is absent from the bottom wall of the kettle 60, which is thus flat.

Direct heat and fluidising is provided by hot gas from a combustion chamber 72 substantially within the upper portion of the interior of kettle 60. The combustion chamber 72 extends below the level 74 of the gypsum in the kettle. The combustion chamber has a fuel inlet 76 and an air inlet 78. The fuel/air mixture is burnt in the combustion chamber 72, and the hot gas produced leaves the combustion chamber through dip tubes 80, opening from the lower wall of the combustion chamber. The tubes are restrained against excessive movement by a framework 82 at their lower ends.

Because of the presence of the upright cone 62 on the bottom wall of the kettle, the outer dip tubes are longer than the inner dip tubes to ensure efficient fluidisation of gypsum in the lowest region of the kettle. Since an increase in dip tube length increases the back pressure in the dip tube, the outer dip tubes are advantageously wider than the inner dip tubes to compensate.

In the embodiment shown in FIG. 2, the plurality of dip tubes comprises 16 large (for example 4 inch (10 cm) diameter) dip tubes arranged in a ring around the outer edge of the combustion chamber 72, a first inner ring of 16 slightly smaller (for example 3 inch (7.5 cm) diameter) dip tubes, second and third inner rings of 12 and 8 small (for example 2 inch (5 cm) diameter) dip tubes and a central 3 inch (7.5 cm) diameter dip tube. In the embodiment shown, the lengths of the dip tubes 80 are such that they end substantially the same distance above the upright cone on the bottom wall of the kettle 60. In the alternative embodiment in which no cone is employed, the dip tubes are of substantially the same length as each other, and preferably end between about 5 cm and 15 cm above the bottom wall of the kettle.

Figure 3:
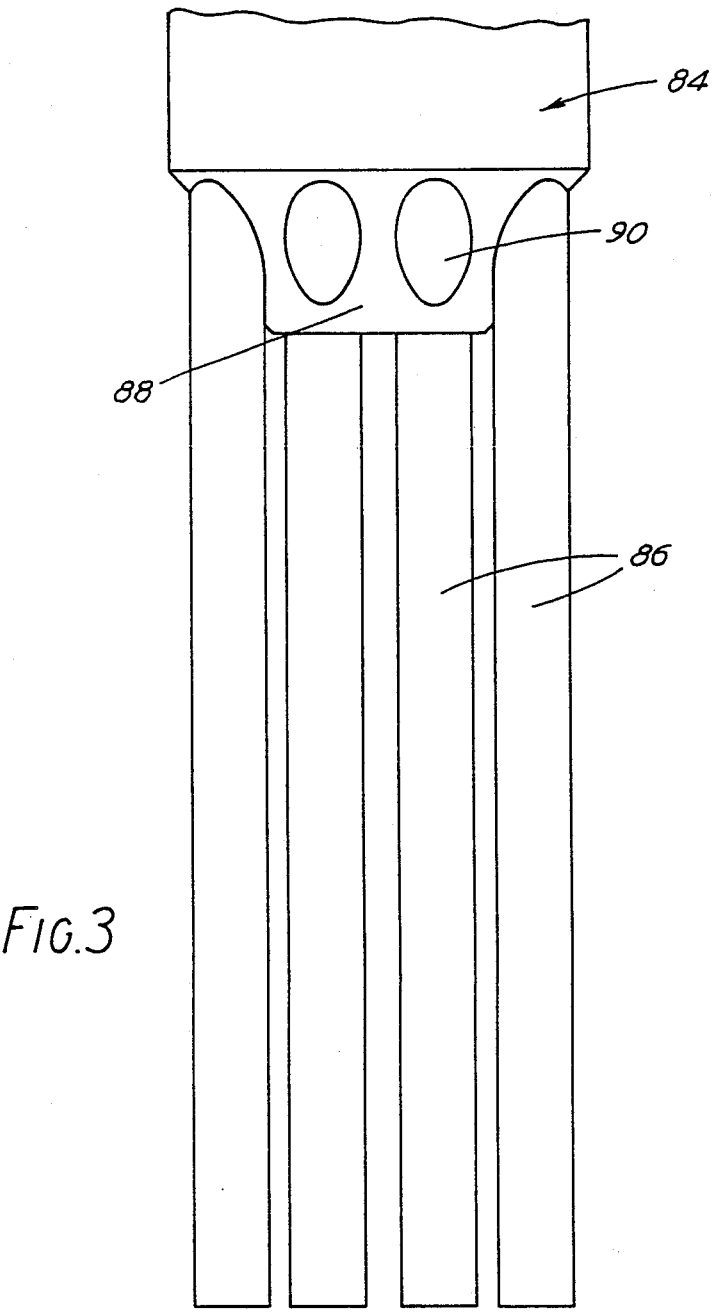
FIG. 3 is a diagrammatic representation of an alternative arrangement of combustion chamber and dip tubes for use in a kettle of the type shown in FIG. 1, with some of the dip tubes not shown.

FIG. 3 shows an alternative arrangement of combustion chamber 84 and dip tubes 86 for use in a kettle of the type shown in FIG. 1 embodying the invention. Some of the dip tubes 86 are not shown for clarity. In this arrangement, the lower portion 88 of the combustion chamber 84 is in the form of an inverted frustocone. The dip tubes 86 open from the inclined face of the frustoconical lower portion 88 of the combustion chamber through openings 90, and extend downwardly into the kettle. Combustion takes place in the combustion chamber 84, and the hot gas generated passes out of the combustion chamber and into the gypsum in the kettle through the dip tubes 86.

A similar arrangement may be employed with the conical kettle of FIG. 2. In this case, the lower portion of the combustion chamber 72 is frustoconical.

In kettles employing apparatus according to the invention, the hot gas passing down the dip tubes heats the surrounding gypsum by heat exchange through the dip tube walls. The rate of heat exchange can be increased by provision of internal or external fins on the dip tubes. The rate of heat exchange through the walls of the plurality of dip tubes is greater than is the case with a single dip tube, and so, for a given heat input to the dip tubes, the temperature of the gas entering the gypsum from the open lower ends of the dip tubes is lower. This results in a lower level of insoluble anhydrite formation. The temperature of the gas entering the gypsum is preferably about 700° C. to 800° C., but may be as low as 600° C. or 500° C.

The number of tubes employed can vary, and some or all of the tubes may be provided with adjustable restrictions to control gas passage through them, enabling the heating and fluidisation of the bed to be controlled. Constraints on the size and number of tubes are the requirement that each tube be surrounded by gypsum and that the pressure drop across the tubes is not excessive.

For example, in the embodiment shown in FIG. 2, the gas entering the gypsum may be at the following temperatures:

4 inch (10 cm) diameter tubes: 825° C.
3 inch (7.5 cm) diameter tubes: 739° C.
2 inch (5 cm) diameter tubes: 593° C.

The average gas temperature, weighted for relative flow rate through the tubes, is 758° C. This compares with 1046° C. for a plain 44 inch (110 cm) diameter tube or 934° C. for a 44 inch (110 cm) diameter tube with 30 internal fins each 3 inch by ⅜ inch (7.5 cm by 1 cm).

The above figures are based on a 14 000 000 Btu/hr oil fired burner using 70% excess air, and providing gas at about 1300° C. into 7 ft (210 cm) long dip tubes.

Heat transfer through the dip tube walls is improved. In this example the total heat transfer is about 3.8 million Btu/hr, compared with less than 2 million Btu/hr for the 44 inch (110 cm) tube with the internal fins described above.

It will thus be seen that the present invention provides a method and apparatus for calcining of gypsum in which lower temperature gases are in contact with the gypsum than has been possible before. This reduces the formation of insoluble anhydrite, and gives gypsum plaster of improved quality.

We claim:

1. Apparatus for calcining gypsum to produce a plaster having a minimal anhydrite content, comprising:
   a kettle for containing the gypsum material;
   a combustion chamber associated with the kettle and providing a source of non-reacting hot post combustion gases: and
   a plurality of uninsulated, gas conducting tubes each connected at its upper end to and in gas receiving communication with the source of combustion gases and extending generally downwardly therefrom into the contents of the kettle and having an opening at its lower end for discharging the combustion gases into the kettle contents, said tubes having heat conductive walls effective to conduct heat from the flowing hot gases to the kettle contents through said walls before discharging said gases, the number and size of the tubes being such that the total heat conductive surface area of the plurality of tubes is at least twice the heat conductive surface area of a single tube large enough to handle the same volume of gases.

2. An apparatus according to claim 1, wherein the plurality of tubes are arranged spaced apart in a series of concentric rings.

3. An apparatus according to claim 1, wherein the kettle has a generally frustoconically-shaped lower portion including a generally flat bottom wall.

4. An apparatus according to claim 3, wherein the kettle further includes an upright cone of heat resistant material extending into the interior of the kettle from the bottom wall, and wherein the lower ends of the gas conducting tubes respectivey terminate generally equidistantly from the surface of the upright cone.

5. Apparatus according to claim 4, wherein the plurality of tubes are arranged spaced apart in a series of rings concentric with the vertical axis of the upright cone.

6. Apparatus according to claim 5, wherein the gas conducting tubes in each concentric ring are larger in cross-section and longer than the tubes in each successive inner concentric ring to ensure efficient fluidization of the material in the lowest region in the kettle.

7. Apparatus according to claim 1, wherein all of the heat for calcining the gypsum material put through the kettle is provided by the hot gases conducted through the plurality of tubes.

8. Apparatus according to claim 1, wherein the combustion chamber is suitable for burning fuel to provide post combustion gases at a temperature of about 1300° C. and wherein the plurality of tubes are sized and shaped such as to promote sufficient heat transfer from the hot combustion gases through the tube walls to the gypsum material in the kettle before the gases are discharged that the temperature of the gases at the discharge end of the tubes is reduced to between 500° C. and 800° C.

9. Apparatus according to claim 1, wherein said combustion chamber comprises an upper portion and a lower portion, said lower portion being frustoconical, and wherein said tubes are connected to and extend downwardly from said frustoconical lower portion.

10. Apparatus according to claim 1, wherein the interior of the kettle tapers toward the bottom thereof.

11. Apparatus according to claim 1, wherein at least one of said tubes is provided with means to control the flow of hot gas there through.

* * * * *